3,166,554
BENZOTHIAZINES
John Krapcho, Somerset, N.J., assignor to Olin Mathieson Chemical Corporation, New York, N.Y., a corporation of Virginia
No Drawing. Filed June 25, 1962, Ser. No. 205,128
6 Claims. (Cl. 260—243)

This application is a continuation-in-part of my application, Serial No. 115,618, filed June 8, 1961, now abandoned, which in turn is a continuation-in-part of my application, Serial No. 842,202, filed September 25, 1959, and now abandoned.

This invention relates to new chemical compounds having valuable therapeutic properties and processes for the preparation thereof.

The therapeutically active compounds of this invention are bases of the general Formula I:

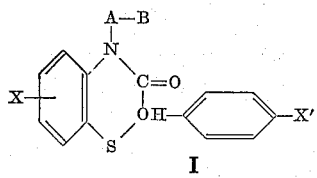

I and the acid-addition salts thereof, wherein X is hydrogen, lower alkyl, lower alkoxy, nitro, halo or trifluoromethyl; X' is chloro or bromo; A is lower alkylene (preferably ethylene and propylene); and B is a basic nitrogen-containing radical of less than twelve carbon atoms. Among the suitable radicals represented by the symbol B are: amino; (lower alkyl)amino; di-(lower alkyl)amino; (hydroxy-lower alkyl)amino; di(hydroxy-lower alkyl)amino; phenyl(lower alkyl)amino; N-(lower alkyl)-phenyl (lower alkyl)amino; and saturated 5 to 6 membered monocyclic heterocyclic radicals of less than twelve carbon atoms, as exemplified by piperidino;
(lower alkyl) piperidino;
di(lower alkyl)piperidino;
(lower alkoxy)piperidino;
2, 3 or 4-piperidyl;
2, 3 or 4-(N-lower alkyl-piperidyl);
pyrrolidino;
(lower alkyl)pyrrolidino;
di(lower alkyl)-pyrrolidino;
(lower alkoxy)pyrrolidino;
2 or 3-pyrrolidyl;
2 or 3-(N-lower alkyl-pyrrolidyl);
morpholino;
(lower alkyl)-morpholino;
di(lower alkyl)morpholino;
(lower alkoxy)-morpholino;
thiamorpholino;
(lower alkyl)thiamorpholino;
di(lower alkyl)thiamorpholino;
(lower alkoxy)thiamorpholino;
piperazino;
(lower alkyl)piperazino (e.g., N⁴methylpiperazino);
di(lower alkyl)piperazino;
and (lower alkoxy)piperazino.

The terms "lower alkyl," "lower alkoxy," and "lower alkylene," as employed herein, include both straight and branched chain radicals of less than eight carbon atoms. The particularly preferred compounds are those wherein X is hydrogen or chloro, X' is chloro, A is ethylene or propylene and B is di(lower alkyl)amino; and optimally X is hydrogen and AB is diethylamino ethyl.

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids such as oxalic, tartaric, citric, acetic and succinic acid, theophylline and 8-chlorotheophylline.

The 2-(p-halophenyl)-N-(aminoalkyl) compounds of this invention and the acid-addition salts thereof, possess surprisingly high antitremor activity when compared with unsubstituted or otherwise substituted 2-phenyl-N-(aminoalkyl) derivatives and thus are uniquely well suited for the treatment of Parkinsonism. Thus, when tested for their activity in inhibiting the effects of Tremorine (a chemical agent which produces tremors in mice similar to those found in persons suffering from Parkinsonism), the effective oral dose ($ED_{50}$) of 4-(2 - diethylaminoethyl) - 2-phenyl-1,4-benzothiazin-3-one hydrochloride to overcome the effects of all tremors produced by 20 milligrams per kilogram weight (m.p.k.) of Tremorine was found to be 110 m.p.k. However, 4-(2 - diethylaminoethyl) - 2 - (p-chlorophenyl)-1,4-benzothiazin-3-one hydrochloride, one of the compounds of the instant invention, had an $ED_{50}$ of 53 m.p.k., whereas, each of the following compounds, which were also tested, had an $ED_{50}$ greater than 110 m.p.k.: 4-(2-diethylaminoethyl)-2-(o-chlorophenyl) - 1,4-benzothiazin-3-one hydrochloride and 4-(2-diethylaminoethyl)-2 - (p-methoxyphenyl) - 1,4 - benzothiazin - 3 - one hydrochloride. The compounds of this invention can, therefore, be administered perorally in the same manner as benztropine methanesulfonate in the treatment of Parkinsonism, the dosage for such treatment being adjusted for the activity of the particular compound employed.

The compounds of this invention can be prepared by condensing a compound of the Formula II:

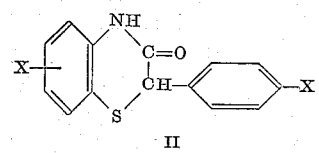

II wherein X and X' are as hereinbefore defined, with an aminoalkyl halide of the formula B—A—Y, wherein B and A are as hereinbefore defined and Y is halide, particularly chloride. This reaction is preferably conducted by heating the reactants in the presence of a basic condensing agent, such as an alkali metal, an alkali metal amide (e.g., sodamide), or an alkali metal hydroxide. To form the acid-addition salts, the free base initially formed is interacted with at least one equivalent of the desired acid.

To prepare the starting materials (the compounds of Formula II) a 2-aminothiophenol of the Formula III:

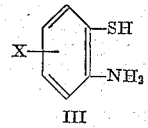

III wherein X is as hereinbefore defined, is interacted with a halo acid ester of the Formula IV:

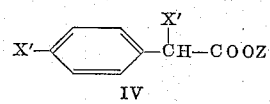

IV where X' is as hereinbefore defined, Z can be hydrogen or any organic radical and preferably is lower alkyl (e.g., methyl and ethyl), and Y' is halide (particularly bromide).

Suitable reactants III include 2-aminobenzenethiol; 2-amino-(lower alkyl)benzenethiols, such as 2-aminotoluenethiols (e.g., 2-amino p-toluenethiol), 2-aminoethyl-benzene-thiols, 2-amino-n-propylbenzenethiols, 2-amino-isopropylbenzenethiols, 2-amino-butylbenzenethiols, and 2-aminohexylbenzenethiols; 2-amino - lower alkoxybenzenethiols, such as 2-amino-methoxybenzenethiols (e.g., 2-amino-p-anisolethiol), 2-amino-ethoxybenzenethiols, 2-amino-n-propoxybenzenethiols, and 2-amino-pentoxybenzenethiols; 2-amino-nitrobenzenethiols (e.g., 2-amino-m-nitrobenzenethiol); 2-amino-halobenzenethiols, such as 2-amino-chlorobenzenethiols (e.g., 2-amino-4-chlorobenzenethiols), 2-amino-bromobenzenethiols and 2-amino-fluorobenzenethiols; and 2-amino-trifluoromethylbenzenethiols, such as 2-amino-4-trifluoromethylbenzenethiol.

Suitable reactants IV include α-halo-p-halophenyl acetic acids, particularly α,p-dibromphenyl acetic acid and α-bromo-p-chlorophenyl acetic acid.

The following examples illustrate the invention (all temperatures being in centigrade):

EXAMPLE 1

*4-(2-diethylaminoethyl)-2-(p-chlorophenyl)-1,4-benzothiazin-3-one hydrochloride*

(a) *Preparation of α - bromo - p - chlorophenylacetic acid.*—A mixture of 50 g. of p-chloromandelic acid, 60 ml. of 48% hydrogen bromide and 30 ml. of sulfuric acid is refluxed for three hours, cooled and poured into 500 g. of ice. The solid weighs about 64 g., M.P. about 75–84°. After distillation of this material at 153–155° (0.1 mm.), the colorless material melts at about 95–96°.

(b) *Preparation of 2-(p-chlorophenyl)1-4benzothiazin-3-one.*—A mixture of 92.0 g. of α-bromo-p-chlorophenyl-acetic acid, 92.0 g. of 2-aminobenzenethiol and 460 ml. of xylene is refluxed for three hours, cooled, filtered and the product suspended in 500 ml. of water. The mixture is filtered. The solid is washed with 500 ml. of 5% sodium bicarbonate and then 1 l. of water, followed by crystallization from 350 ml. of acetonitrile to give 73 g. of product, M.P. about 194–195°.

(c) *4-(2-diethylaminoethyl)-2 - (p-chlorophenyl) - 1,4-benzothiazin-3-one hydrochloride.*—A suspension of 3.2 of sodamide in 150 ml. of toluene is treated with a suspension of 21.0 g. of 2-(p-chlorophenyl)-1,4-benzothiazin-3-one in 250 ml. of toluene. The mixture is stirred and refluxed for ninety minutes during which time the starting material dissolves and the sodium salt separates as a fluocculent precipitates. The slurry is cooled to room temperature and treated with a solution of 11.5 g. of 2-diethyl-aminoethyl chloride in 50 ml. of toluene. The resulting mixture is stirred and refluxed for two hours. After cooling, the almost clear reaction mixture is treated with 50 ml. of water (discarded) and the organic phase then extracted with a solution of 8 ml. of concentrated hydrochloric acid in 100 ml. of water. The aqueous phase is washed with 100 ml. of ether and then basified with a solution of 6 g. of sodium hydroxide in 25 ml. of water. The liberated base is extracted with ether and dried over magnesium sulfate for two hours. The mixture is filtered and the filtrate treated with a slight excess of alcoholic hydrogen chloride to yield a semi-solid which crystallizes upon cooling. After recrystallization of this material from 20 ml. of acetonitrile, and then from 12 ml. chloroform 30 ml. of ether the colorless product, M.P. about 155–156°, is obtained.

EXAMPLE 2

*4-(2-dimethylaminoethyl)-2-(p-chlorophenyl)-1,4-benzothiazine-3-one hydrochloride*

Interaction of 33.1 g. of 2-(p-chlorophenyl)-1,4-benzo-thiazin-3-one with 5.0 g. of sodamide in toluene, followed by 19.0 g. of 2-dimethylaminoethyl chloride according to the procedure described in Example 1 gives 27 g. of the desired product, M.P. about 213–217°. After crystallization from 200 ml. of methanol, the colorless product, M.P. about 217–218, is obtained.

EXAMPLE 3

*4-[2-(4-morpholinyl)ethyl]-2-(p-chlorophenyl)-1,4-benzothiazine-3-one hydrochloride*

The reaction between 30.0 g. of 2-(p-chlorophenyl)-1,4-benzothiazin-3-one, 5.0 g. of sodamide and 21.0 g. of 2-(morpholinyl)ethyl chloride in toluene according to the procedure described in Example 1 gives about the free base. The same is dissolved in 100 ml. of warm absolute alcohol and then treated with one equivalent of hydrogen chloride in 17 ml. of absolute alcohol. The resulting solution is diluted with ether (200 ml.) until the hydrochloride begins to crystallize. The mixture is cooled, diluted with an additional 200 ml. of ether and filtered to yield the hydrochloride salt.

EXAMPLE 4

*4-(2-diisopropylaminoethyl)-2-(p-chlorophenyl)-1,4-benzothiazin-3-one, hydrochloride*

48.3 g. of 2-(p-chlorophenyl)-1,4-benzothiazin-3-one is reacted with 8.2 g. of sodamide and 37.6 g. of 2-diisopropylaminoethyl chloride according to the procedure described in Example 1 to give the desired product.

EXAMPLE 5

*2-(p-chlorophenyl)-4-(2-diethylamino-1-methylethyl)-1,4-benzothiazin-3-one hydrochloride*

Reaction of 2-(p-chlorophenol)-1,4-benzothiazin-3-one with sodamide and then 2 - diethylamino - 1 - methylethyl chloride according to the procedure described in Example 1 yields (p-chlorophenyl) - 4 - (2-diethylamino-1-methyl-ethyl)-1,4-benzothiazine-3-one hydrochloride.

EXAMPLE 6

*4-(3-dimethylaminopropyl)-2-(p-chlorophenyl)-1,4-benzothiazine-3-one hydrochloride*

This product is obtained by interaction of 2-(p-chloro-phenyl)-1,4-benzothiazin-3-one with sodamide and 3-dimethylaminopropyl chloride, according to the procedure described in Example 1.

EXAMPLE 7

*6-chloro-4-(2-diethylaminoethyl)-2-(p-chlorophenyl)-1,4-benzothiazin-3-one oxalate*

(a) *Preparation of 6-chloro - 2 - (p-chlorophenyl)-1,4-benzothiazin-3-one.*—A mixture of 225 g. of 2-amino-4-chlorothiophenol [(J.A.C.S. 56, 309, (1931)], 200 g. methyl α-bromo-p-chlorophenylacetate and 1 l. of xylene is refluxed for three hours. After removal of part of the solvent, the product crystallizes as a colorless solid.

(b) *Preparation of 6-chloro-4-(2-diethylaminoethyl)-2-(p-chlorophenyl) - 1,4 - benzothiazin - 3 - one hydrochloride.*—27.6 g. of 6-chloro-2-(p-chlorophenyl)-1,4-benzo-thiazin-3-one is reacted with 4.0 g. of sodamide and 14 g. of 2-diethylaminoethyl chloride according to the procedure of Example 1 to give 6-chloro-4-(2-diethylamino-ethyl)-2-(p-chlorophenyl)-1,4-benzothiazin-3- one hydrochloride.

(c) *Preparation of 6-chloro-4-(2-diethylaminoethyl)-2-(p - chlorophenyl)-1,4-benzothiazin-3-one.*—A suspension of 41.2 g. of the hydrochloride obtained in step b in 100 ml. of water is treated with a solution of 4 g. of sodium hydroxide in 20 ml. of water. The liberated base is extracted with ether and dried over magnesium sulfate. Evaporation of the solvent gives pure 6-chloro-4-(2 - diethylaminoethyl) - 2 - (p-chlorophenyl)-1,4-benzo-thiazin-3-one.

(d) *Preparation of 6-chloro-4-(2-diethylaminoethyl)-2-(p-chlorophenyl) - 1,4 - benzothiazin-3-one oxalate.*—A solution of 37.5 g. of the base obtained in step c in 50 ml. of ethanol is treated with a solution of 9.0 g. oxalic acid in 50 ml. of ethanol. Dilution of this solution to 500 ml. with ether yields a colorless crystalline product.

EXAMPLE 8

*6-methyl-4-(2-diethylaminoethyl)-2-(p-chlorophenyl)-1,4-benzothiazin-3-one hydrochloride*

Following the procedure of steps *a* and *b* of Example 7, but substituting an equivalent amount of 2-amino-4-toluenethiol for the 2-amino-4-chlorobenzenethiol in step *a*, 6 - methyl-4-(2-diethylaminoethyl)-2-(p-chlorophenyl)-1,4-benzothiazin-3-one hydrochloride is obtained.

EXAMPLE 9

*6-methoxy-4-(2-diethylaminoethyl)-2-(p-chlorophenyl)-1,4-benzothiazin-3-one hydrochloride*

Following the procedure of steps *a* and *b* of Example 7, but substituting an equivalent amount of 2-amino-4-anisolthiol for the 2-amino-4-chlorobenzenethiol in step *a*, 6 - methoxy - 4 - (2 - diethylaminoethyl)-2-(p-chlorophenyl)-2-(p-chlorophenyl)-1,4-benzothiazin - 3 - one hydrochloride si obtained.

EXAMPLE 10

*4-(2-diethylaminoethyl)-2-(p-chlorophenyl)-6-(trifluoromethyl)-1,4-benzothiazin-3-one, hydrochloride*

(*a*) *Preparation of 2-(p-chlorophenyl)-6-trifluoromethyl)-1,4-benzothiazin - 3 - one.*—A mixture of 23.2 g. of α-bromo - p - chlorophenylacetic acid and 49.5 g. of 2-amino-4-(trifluoromethyl) - thiophenol is heated in an oil bath for two hours at 180–190°, cooled, the solid is pulverized and suspended in 500 ml. of water. The mixture is filtered. The solid is washed with 500 ml. of 5% sodium bicarbonate and then 1 l. of water, followed by crystallization from 350 ml. of acetonitrile to give the product.

(*b*) *Preparation of 4-(2-diethylaminoethyl)-2-(p-chlorophenyl)-6-(trifluoromethyl)-1,4-benzothiazepin-3 - one, hydrochloride.*—21.0 g. of 2-(p-chlorophenyl)-6-(trifluoromethyl)-1,4-benzothiazin-3-one is reacted with 2.9 g. of sodamide and 10.1 g. of 2-diethylaminoethyl chloride according to the procedure of Example 1 to give the product.

EXAMPLE 11

*4-(2-piperidinoethyl)-2-(p-chlorophenyl)-1,4-benzothiazine-3-one hydrochloride*

30.1 g. of 2-(p-chlorophenyl)-1,4-benzothiazine-3-one is reacted with 6.3 g. of sodamide and 20.0 g. of piperidinoethyl chloride according to the procedure described in Example 1 to give a colorless produce.

EXAMPLE 12

*4-(2-pyrrolidinoethyl)-2-(p-chlorophenyl)-1,4-benzothiazin-3-one hydrochloride*

Reaction of 2-(p-chlorophenyl)-1,4-benzothiazin-3-one with sodamide and then pyrrolidinoethyl chloride according to the procedure described in Example 1 yields 4-(2-pyrrolidinoethyl-2-(p-chlorophenyl)-1,4 - benzothiazin-3-one hydrochloride.

EXAMPLE 13

*4-[2-(4-methyl-1-piperazinyl)ethyl]-2-(p-chlorophenyl)-1,4-benzothiazin-3-one dihydrochloride*

38.5 g. of 2-(p-chlorophenyl)-1,4-benzothiazin-3-one is reacted with 6.7 of sodamide and 28.8 g. of 4-methyl-1-piperazinylethyl chloride according to the procedure described in Example 1 to give the dihydrochloride salt.

EXAMPLE 14

*4-(2-diethylaminoethyl)-2-(p-bromophenyl)-1,4-benzothiazin-3-one hydrochloride*

Following the procedure of Example 1, but substituting p-bromomandelic acid for the p-chloromandelic acid in step *a* of the example, 4-(2-diethylaminoethyl)-2-p-bromophenyl)-1,4-benzothiazin-3-one hydrochloride is obtained.

Similarly, the p-bromophenyl derivatives of the compounds of Examples 2 through 13 can be obtained.

The invention may be variously otherwise embodied within the scope of the appended claims.

What is claimed is:

1. A compound selected from the group consisting of bases of the formula

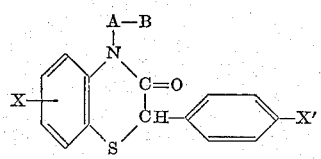

and pharmaceutically-acceptable acid-addition salts thereof, wherein X is selected from the group consisting of hydrogen, lower alkyl, lower alkoxy, nitro, halo and trifluoromethyl; X' is selected from the group consisting of bromo and chloro; A is lower alkylene; and B is a basic nitrogen-containing radical of less than twelve carbon atoms selected from the group consisting of amino, (lower alkyl)amino, di(lower alkyl)amino, (hydroxy-lower alkyl)amino, di(hydroxy-lower alkyl)amino, phenyl(lower alkyl)amino, N-(lower alkyl)-phenyl(lower alkyl)amino, piperidyl, (lower alkyl) piperidyl, di(lower alkyl)piperidino, (lower alkoxy)piperidino, pyrrolidyl, (lower alkyl)pyrrolidyl, di(lower alkyl)pyrrolidino, (lower alkoxy)pyrrolidino, morpholino, (lower alkyl) morpholino, di(lower alkyl)morpholino, (lower alkoxy) morpholino, thiamorpholino, (lower alkyl)thiamorpholino, di(lower alkyl)thiamorpholino, (lower alkoxy)thiamorpholino, piperazino, (lower alkyl)piperazino, di (lower alkyl)piperazino and (lower alkoxy)piperazino.

2. A pharmaceutically-acceptable acid-addition salt of a compound of the formula

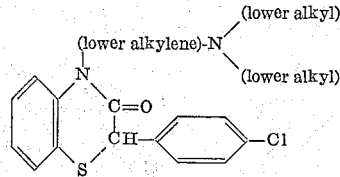

3. A pharmaceutically-acceptable acid-addition salt of 4-(2-diethylaminoethyl) - 2 - (p-chlorophenyl)-1,4-benzothiazin-3-one.

4. A pharmaceutically-acceptable acid-addition salt of 4-(2-dimethylaminoethyl)-2-(p-chlorophenyl)1-,4-benzothiazin-3-one.

5. 4-(2-diethylaminoethyl - 2 - (p - chlorophenyl) - 1,4-benzothiazin-3-one hydrochloride.

6. 4-(2-dimethylaminoethyl)-2-(p-chlorophenyl) - 1,4-benzothiazin-3-one hydrochloride.

References Cited by the Examiner
UNITED STATES PATENTS

| | | | |
|---|---|---|---|
| 2,824,102 | 2/58 | Zimmermann | 260—243 |
| 2,956,055 | 10/60 | Laubach | 260—243 |
| 2,963,476 | 12/60 | de Stevens | 260—243 |
| 3,006,916 | 10/61 | Winthrop et al. | 260—243 |

IRVING MARCUS, *Primary Examiner.*

NICHOLAS S. RIZZO, WALTER A. MODANCE,
*Examiners.*

UNITED STATES PATENT OFFICE
CERTIFICATE OF CORRECTION

Patent No. 3,166,554　　　　　　　　　　January 19, 1965

John Krapcho

It is hereby certified that error appears in the above numbered patent requiring correction and that the said Letters Patent should read as corrected below.

Column 1, lines 19 to 25, Formula I should appear as shown below instead of as in the patent:

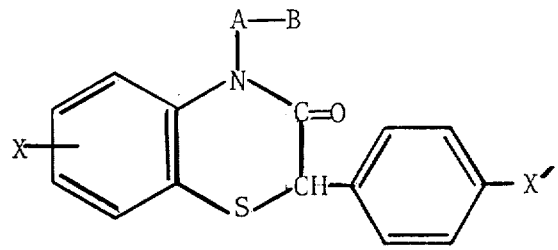

same column 1, line 61, for "$N^4$methylpiperazino)" read -- $N^4$-methylpiperazino) --; column 2, lines 37 to 41, Formula II should appear as shown below instead of as in the patent:

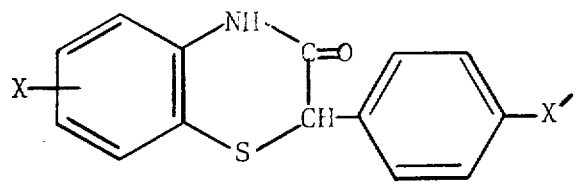

3,166,554 same column 2, line 48, for "reatcants" read -- reactants --; lines 63 to 67, Formula IV should appear as shown below instead of as in the patent:

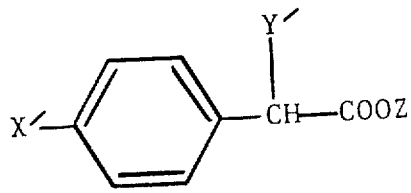

column 3, line 31, for "4benzothiazin-" in italics, read -- 4-benzothiazin- --, in italics; column 5, line 18, for "phenyl)-2-(p-chlorophenyl)-1,4-benzothiazin-3-one hy-" read -- phenyl)-1,4-benzothiazin-3-one hy- --; line 19, for "si" read -- is --; same column 5, line 48, for "produce" read -- product --.

Signed and sealed this 15th day of June 1965.

(SEAL)
Attest:

ERNEST W. SWIDER
Attesting Officer

EDWARD J. BRENNER
Commissioner of Patents